United States Patent
Schwarz et al.

(10) Patent No.: US 9,611,859 B2
(45) Date of Patent: Apr. 4, 2017

(54) GAS TURBINE ENGINE WITH HIGH SPEED LOW PRESSURE TURBINE SECTION AND BEARING SUPPORT FEATURES

(75) Inventors: Frederick M. Schwarz, Glastonbury, CT (US); Gabriel L. Suciu, Glastonbury, CT (US); William K. Ackermann, East Hartford, CT (US); Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 13/446,510

(22) Filed: Apr. 13, 2012

(65) Prior Publication Data

US 2013/0195648 A1 Aug. 1, 2013

Related U.S. Application Data

(63) Continuation-in-part of application No. 13/363,154, filed on Jan. 31, 2012, now abandoned.

(60) Provisional application No. 61/619,124, filed on Apr. 2, 2012.

(51) Int. Cl.
| | |
|---|---|
| F02K 3/06 | (2006.01) |
| F04D 29/056 | (2006.01) |
| F02C 7/06 | (2006.01) |
| F02C 7/20 | (2006.01) |

(52) U.S. Cl.
CPC ............. *F04D 29/056* (2013.01); *F02C 7/06* (2013.01); *F02C 7/20* (2013.01); *F02K 3/06* (2013.01)

(58) Field of Classification Search
USPC .............. 60/226.1, 226.3, 268, 39.162, 796; 416/124
See application file for complete search history.

(56) References Cited

U.S. PATENT DOCUMENTS

| | | |
|---|---|---|
| 3,287,906 A | 11/1966 | McCormick |
| 3,754,484 A | 8/1973 | Roberts |
| 3,892,358 A | 7/1975 | Gisslen |
| 4,130,872 A | 12/1978 | Haloff |
| 1,448,019 A | 5/1984 | Klees |

(Continued)

FOREIGN PATENT DOCUMENTS

| | | |
|---|---|---|
| EP | 1340902 A2 | 9/2003 |
| EP | 1577491 A1 | 9/2005 |

(Continued)

OTHER PUBLICATIONS

Kandebo, Stanley, "Geared-Turbofan Engine Design Targets Cost, Complexity", 1998, Aviation Week & Space Technology, vol. 148, Issue 8.*

(Continued)

*Primary Examiner* — Steven Sutherland
(74) *Attorney, Agent, or Firm* — Carlson, Gaskey & Olds, PC

(57) ABSTRACT

A gas turbine engine includes a very high speed fan drive turbine such that a quantity defined by the exit area of the low pressure turbine multiplied by the square of the low pressure turbine rotational speed compared to the same parameters for the high pressure turbine is at a ratio between about 0.5 and about 1.5. The high pressure turbine is mounted by bearings positioned at an outer periphery of a shaft driven by the high pressure turbine.

21 Claims, 2 Drawing Sheets

(56) References Cited

U.S. PATENT DOCUMENTS

| | | | |
|---|---|---|---|
| 4,809,498 | A | 3/1989 | Giffin, III et al. |
| 5,074,109 | A | 12/1991 | Mandet et al. |
| 5,433,674 | A | 7/1995 | Sheridan et al. |
| 5,447,411 | A | 9/1995 | Curley et al. |
| 5,524,847 | A | 6/1996 | Brodell et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,814,541 | B2 | 11/2004 | Evans et al. |
| 7,021,042 | B2 | 4/2006 | Law |
| 7,591,754 | B2 | 9/2009 | Duong et al. |
| 7,600,370 | B2 | 10/2009 | Dawson |
| 7,694,505 | B2 | 4/2010 | Schilling |
| 7,824,305 | B2 | 11/2010 | Duong et al. |
| 7,926,260 | B2 | 4/2011 | Sheridan et al. |
| 8,061,969 | B2 | 11/2011 | Durocher et al. |
| 8,091,371 | B2 | 1/2012 | Durocher et al. |
| 8,205,432 | B2 | 6/2012 | Sheridan |
| 2006/0236675 | A1 | 10/2006 | Weiler |
| 2008/0190095 | A1 | 8/2008 | Baran |
| 2009/0056306 | A1 | 3/2009 | Suciu et al. |
| 2009/0092494 | A1 | 4/2009 | Cairo et al. |
| 2009/0229242 | A1* | 9/2009 | Schwark ............... 60/226.1 |
| 2010/0132376 | A1* | 6/2010 | Durocher et al. ........... 60/797 |
| 2010/0148396 | A1 | 6/2010 | Xie et al. |
| 2010/0331139 | A1 | 12/2010 | McCune |
| 2012/0291449 | A1 | 11/2012 | Adams |
| 2016/0032826 | A1 | 2/2016 | Rued |

FOREIGN PATENT DOCUMENTS

| | | |
|---|---|---|
| EP | 1921253 A2 | 5/2008 |
| EP | 2192273 A2 | 6/2010 |
| GB | 1516041 | 6/1978 |
| GB | 2041090 | 9/1980 |
| WO | 2007038674 | 4/2007 |

OTHER PUBLICATIONS

Mattingly et al., Aircraft Engine Design, 2002, American Institute of Aeronautics and Astronautics, 2nd Edition, p. 292.*

Jane's Aero-Engines, Issue Seven, Copyright 2000, pp. 510-512.

NASA/TM 2010-216758—Assessment of Aerodynamic Challenges of a Variable-Speed Power Turbine for Large Civil Tilt-Rotor Application, Welch, Aug. 2010.

NASA/TM 2012-217605—Variable-Speed-Power-Turbine Research at Glenn Research Center, Welch, Jul. 2012.

P&W Propulsion Systems Studies, NASA High Speed Research Workshop, May 14-16, 1991.

Design Optimization of a Variable-Speed Power-Turbine, Hendricks, et al., Jul. 2014.

NASA/CR 2012-217424—Variable-Speed Power-Turbine for the Large Civil Tilt Rotor, Suchezky, Feb. 2012.

Architectural Comparison of Advanced Ultra-High Bypass Ratio Turbofans for Medium to Long Range Application, Bijewitz, 2014.

Prior Art Direct Drive Engines.

Singapore Search Report for Singapore Application No. 11201403615Q mailed Jan. 4, 2016.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

Supplementary European Search Report for European Application No. 13743282.9 completed Nov. 2, 2015.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

(56) References Cited

OTHER PUBLICATIONS

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines- Turbofan. Feb. 8, 2012.

Ivchenko-Progress AI-727M. Jane's Aero-engines, Aero-engines- Turbofan. Nov. 27, 2011.

Ivchenko-Progress D-727. Jane's Aero-engines, Aero-engines- Turbofan. Feb. 7, 2007.

Turbomeca Aubisque. Jane's Aero-engines, Aero-engines- Turbofan. Nov. 2, 2009.

Aviadvigatel D-110. Jane's Aero-engines, Aero-engines- Turbofan. Jun. 1, 2010.

Rolls-Royce M45H. Jane's Aero-engines, Aero-engines- Turbofan. Feb. 24, 2010.

Honeywell LF502. Jane's Aero-engines, Aero-engines- Turbofan. Feb. 9, 2012.

Honeywell LF507. Jane's Aero-engines, Aero-engines- Turbofan. Feb. 9, 2012.

Honeywell TFE731. Jane's Aero-engines, Aero-engines- Turbofan. Jul. 18, 2012.

Walters, M. H. et al., "Analysis of Turbofan Propulsion System Weight and Dimensions," NASA, TM X-73,199, Jan. 1977.

Wrong, C. B., "An Introduction to the JT15D Engine," ASME, 96-GT-119, 1969.

NASA CR-165608, Energy Efficient Engine, High-Pressure Turbine Detailed Design Report by Robert D. Thulin, et al.

IPR Petition of U.S. Pat. No. 8,899,915, dated Dec. 21, 2016.

* cited by examiner

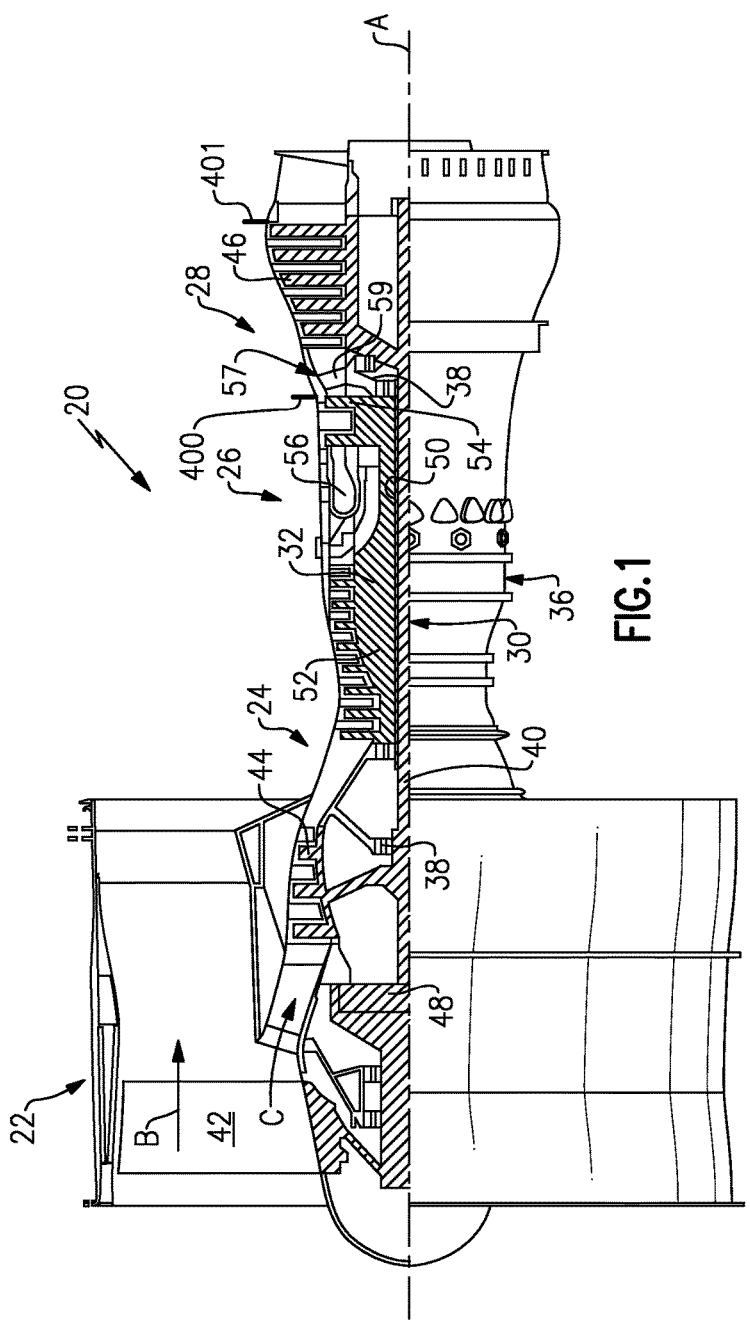
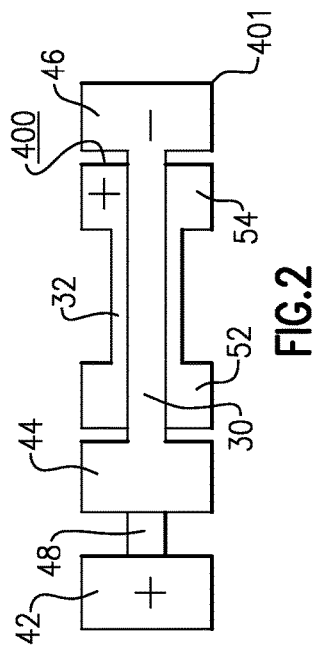

GAS TURBINE ENGINE WITH HIGH SPEED LOW PRESSURE TURBINE SECTION AND BEARING SUPPORT FEATURES

CROSS-REFERENCE TO RELATED APPLICATION

This application claims priority to U.S. Provisional Application No. 61/619,124, filed Apr. 2, 2012, and is a continuation-in-part of U.S. patent application Ser. No. 13/363,154, filed on Jan. 31, 2012 now abandoned and entitled "Gas Turbine Engine With High Speed Low Pressure Turbine Section."

BACKGROUND OF THE INVENTION

This application relates to a gas turbine engine wherein the low pressure turbine section is rotating at a higher speed and centrifugal pull stress relative to the high pressure turbine section speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan.

SUMMARY

In a featured embodiment, a turbine section of a gas turbine engine has a fan drive and second turbine sections. The fan drive turbine section has a first exit area at a first exit point and is configured to rotate at a first speed. The second turbine section has a second exit area at a second exit point and rotates at a second speed, which is faster than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. A mid-turbine frame is positioned intermediate the fan drive and second turbine sections, and has a first bearing supporting an outer periphery of a first shaft rotating with the second turbine section.

In another embodiment according to the previous embodiment, the mid-turbine frame also includes a second bearing supporting an outer periphery of a second shaft rotating with the fan drive turbine section. The second bearing supports an intermediate portion of the second spool.

In another embodiment according to any of the previous embodiments, the ratio is above or equal to about 0.8.

In another embodiment according to any of the previous embodiments, the fan drive turbine section has at least 3 stages.

In another embodiment according to any of the previous embodiments, the fan drive turbine section has up to 6 stages.

In another embodiment according to any of the previous embodiments, the second turbine section has 2 or fewer stages.

In another embodiment according to any of the previous embodiments, a pressure ratio across the fan drive turbine section is greater than about 5:1.

In another embodiment according to any of the previous embodiments, the mid-turbine frame is provided with a guide vane positioned intermediate the fan drive and second turbine sections.

In another embodiment according to any of the previous embodiments, the fan drive and second turbine sections will rotate in opposed directions. The guide vane is a turning guide vane.

In another featured embodiment, a gas turbine engine has a fan, a compressor section in fluid communication with the fan, a combustion section in fluid communication with the compressor section, and a turbine section in fluid communication with the combustion section. The turbine section includes a fan drive turbine section and a second turbine section. The fan drive turbine section has a first exit area at a first exit point and is configured to rotate at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. The second turbine section is supported by a first bearing in a mid-turbine frame.

In another embodiment according to the previous embodiment, the ratio is above or equal to about 0.8.

In another embodiment according to any of the previous embodiments, the compressor section includes first and second compressor sections. The fan drive turbine section and the first compressor section will rotate in a first direction. The second turbine section and the second compressor section will rotate in a second opposed direction.

In another embodiment according to any of the previous embodiments, a gear reduction is included between the fan and a shaft driven by the fan drive turbine section such that the fan will rotate at a lower speed than the fan drive turbine section.

In another embodiment according to any of the previous embodiments, the second turbine section and second compressor section are straddle-mounted by bearings supported on an outer periphery of a shaft rotating with the second compressor section and the second turbine section.

In another embodiment according to any of the previous embodiments, the mid-turbine frame further includes a second bearing supporting an outer periphery of a shaft rotating with the fan drive turbine section.

In another embodiment according to any of the previous embodiments, the second bearing supports an intermediate portion of a shaft that will rotate with the fan drive turbine section and the first compressor section.

In another featured embodiment, a gas turbine engine has a fan, a compressor section in fluid communication with the fan, a combustion section in fluid communication with the compressor section, and a turbine section in fluid communication with the combustion section. The turbine section includes fan drive and second turbine sections. The fan drive turbine section has a first exit area at a first exit point and is configured to rotate at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. The compressor section includes first and second compressor sections, where the fan drive turbine section and the first compressor section will rotate in a first direction and the second turbine section and the second compressor section will rotate in a second opposed direction. A gear reduction is included between the fan and the first compressor section, such that the fan will rotate at a lower speed than the fan drive turbine section, and in the second opposed direction. A gear ratio of the gear reduction is greater than about 2.3.

In another embodiment according to the previous embodiment, the ratio is above or equal to about 0.8.

In another embodiment according to any of the previous embodiments, a mid-turbine frame is positioned intermediate the fan drive and second turbine sections. The mid-turbine frame has a first bearing supporting an outer periphery of a first shaft rotating with the second turbine section.

In another embodiment according to any of the previous embodiments, the first shaft is supported on a second bearing on its outer periphery, with the second bearing mounted to static structure.

These and other features of this disclosure will be better understood upon reading the following specification and drawings, the following of which is a brief description.

BRIEF DESCRIPTION OF THE DRAWINGS

FIG. 1 shows a gas turbine engine.
FIG. 2 schematically shows the arrangement of the low and high spool, along with the fan drive.

DETAILED DESCRIPTION

Figure 3:
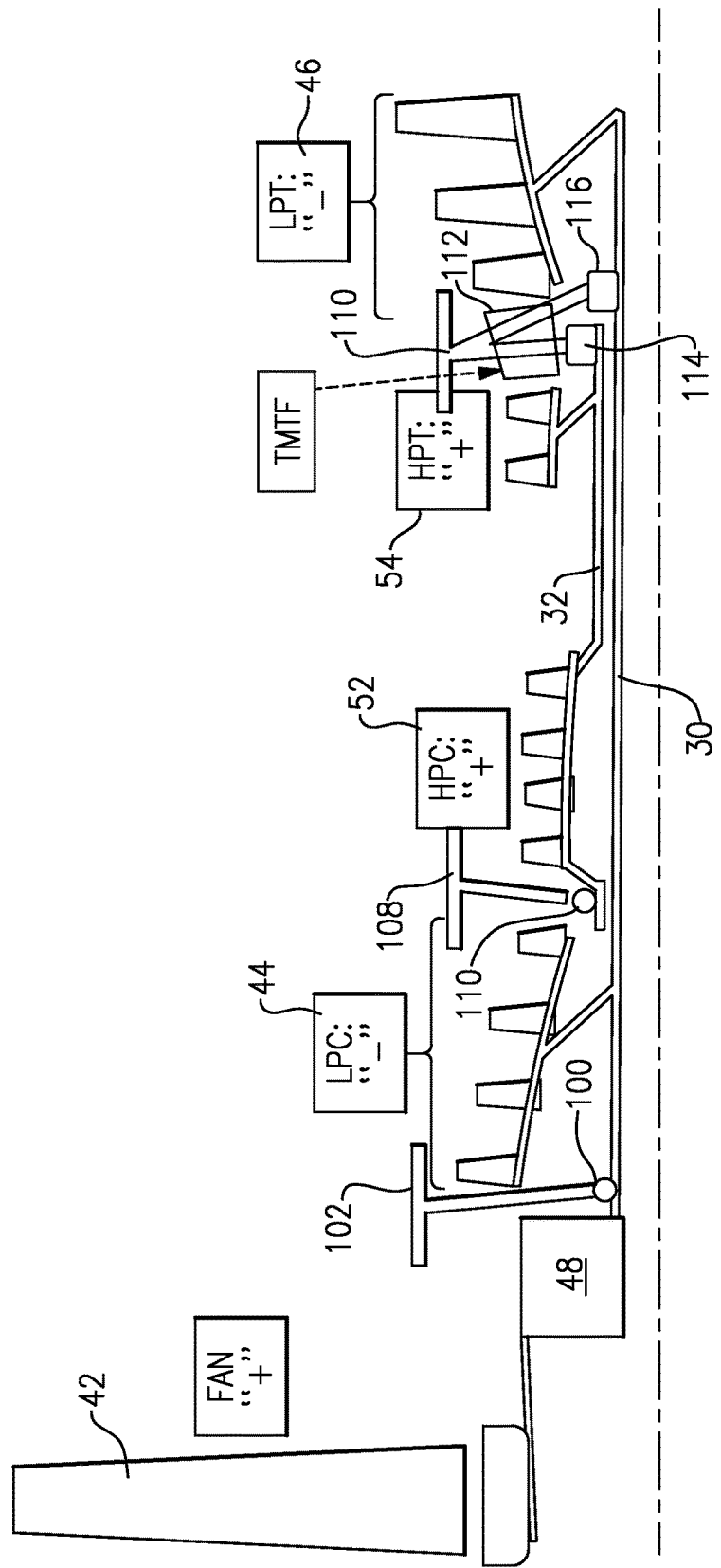
FIG. 3 shows a schematic view of a mount arrangement for an engine such as shown in FIGS. 1 and 2.

FIG. 1 schematically illustrates a gas turbine engine 20. The gas turbine engine 20 is disclosed herein as a two-turbine turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-turbine architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an innermost shaft 40 that interconnects a fan 42, a low pressure (or first) compressor section 44 and a low pressure (or first) turbine section 46. Note, turbine section 46 will also be called a fan drive turbine section. The inner shaft 40 is connected to the fan 42 through a geared architecture 48 to drive the fan 42 at a lower speed than the fan drive turbine 46. The high speed spool 32 includes a more outer shaft 50 that interconnects a high pressure (or second) compressor section 52 and high pressure (or second) turbine section 54. A combustor 56 is arranged between the high pressure compressor section 52 and the high pressure turbine section 54. A mid-turbine frame 57 of the engine static structure 36 is arranged generally between the high pressure turbine section 54 and the low pressure turbine section 46. The mid-turbine frame 57 further supports bearing systems 38 in the turbine section 28. As used herein, the high pressure turbine section experiences higher pressures than the low pressure turbine section. A low pressure turbine section is a section that powers a fan 42. The inner shaft 40 and the outer shaft 50 are concentric and rotate via bearing systems 38 about the engine central longitudinal axis A which is collinear with their longitudinal axes. The high and low spools can be either co-rotating or counter-rotating.

The core airflow C is compressed by the low pressure compressor section 44 then the high pressure compressor section 52, mixed and burned with fuel in the combustor 56, then expanded over the high pressure turbine section 54 and low pressure turbine section 46. The mid-turbine frame 57 includes airfoils 59 which are in the core airflow path. The turbine sections 46, 54 rotationally drive the respective low speed spool 30 and high speed spool 32 in response to the expansion.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In one disclosed embodiment, the engine 20 bypass ratio is greater than about ten (10:1), the fan diameter is significantly larger than that of the low pressure compressor section 44, and the low pressure turbine section 46 has a pressure ratio that is greater than about 5:1. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC"). TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second. Further, the fan 42 may have 26 or fewer blades.

An exit area 400 is shown, in FIG. 1 and FIG. 2, at the exit location for the high pressure turbine section 54 is the annular area of the last blade of turbine section 54. An exit area for the low pressure turbine section is defined at exit 401 for the low pressure turbine section and is the annular area defined by the blade of that turbine section 46. As shown in FIG. 2, the turbine engine 20 may be counter-rotating. This means that the low pressure turbine section 46 and low pressure compressor section 44 rotate in one direction ("−"), while the high pressure spool 32, including high pressure turbine section 54 and high pressure compressor section 52 rotate in an opposed ("+") direction. The gear reduction 48, which may be, for example, an epicyclic transmission (e.g., with a sun, ring, and star gears), is selected such that the fan 42 rotates in the same direction ("+") as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared, or $AN^2$. This performance quantity ("PQ") is defined as:

$$PQ_{ltp}=(A_{lpt} \times V_{lpt}^2) \quad \text{Equation 1}$$

$$PQ_{hpt}=(A_{hpt} \times V_{hpt}^2) \quad \text{Equation 2}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the low pressure turbine section. As known, one would evaluate this performance quantity at the redline speed for each turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2)=PQ_{ltp}/PQ_{hpt} \quad \text{Equation 3:}$$

In one turbine embodiment made according to the above design, the areas of the low and high pressure turbine sections are 557.9 in² and 90.67 in², respectively. Further, the redline speeds of the low and high pressure turbine sections are 10179 rpm and 24346 rpm, respectively. Thus, using Equations 1 and 2 above, the performance quantities for the low and high pressure turbine sections are:

$$PQ_{lpt}=(A_{lpt} \times V_{lpt}^2)=(557.9 \text{ in}^2)(10179 \text{ rpm})^2=57805157673.9 \text{ in}^2 \text{ rpm}^2 \quad \text{Equation 1}$$

$$PQ_{hpt}=(A_{hpt} \times V_{hpt}^2)=(90.67 \text{ in}^2)(24346 \text{ rpm})^2=53742622009.72 \text{ in}^2 \text{ rpm}^2 \quad \text{Equation 2}$$

and using Equation 3 above, the ratio for the low pressure turbine section to the high pressure turbine section is:

$$\text{Ratio}=PQ_{ltp}/PQ_{hpt}=57805457673.9 \text{ in}^2 \text{ rpm}^2/53742622009.72 \text{ in}^2 \text{ rpm}^2=1.075$$

In another embodiment, the ratio was about 0.5 and in another embodiment the ratio was about 1.5. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 are more efficient. Even more narrowly, $PQ_{lpt}/PQ_{hpt}$ ratios above or equal to 1.0 are even more efficient. As a result of these $PQ_{ltp}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more compression in fewer stages. The low pressure compressor section may be made smaller in radius and shorter in length while contributing more toward achieving the overall pressure ratio design target of the engine.

As shown in FIG. 3, the engine as shown in FIGS. 1 and 2 may be mounted such that the high pressure turbine 54 is supported on a rear end by a mid-turbine frame 110. The mid-turbine frame 110 may be provided with a guide vane 112 that is an air turning vane. Since the high pressure turbine 54 and the low pressure or fan drive turbine 46 rotate in opposed directions, the use of the turning vane intermediate the two will ensure that the gases leaving the high pressure turbine 54 approach the low pressure turbine 46 traveling in the proper direction. As is clear from FIG. 3, the mid-turbine frame 110 also includes a bearing 116 which supports a shaft that rotates with the low spool 30 in an "overhung" manner. That is, the bearing 116 is at an intermediate position on the shaft, rather than adjacent the end.

Static structure 102 and 108 support other bearings 100 and 110 to support the shafts driven by spools 30 and 32 on the compressor end. The high pressure turbine 54 can be said to be "straddle-mounted" due to the bearings 110 and 114 on the outer periphery of the shaft 32.

While this invention has been disclosed with reference to one embodiment, it should be understood that certain modifications would come within the scope of this invention. For that reason, the following claims should be studied to determine the true scope and content of this invention.

The invention claimed is:

1. A turbine section of a gas turbine engine comprising:
a fan drive turbine section; and
a second turbine section,
wherein said fan drive turbine section has a first exit area at a first exit point and is configured to rotate at a first speed,
wherein said second turbine section has a second exit area at a second exit point and is configured to rotate at a second speed, which is faster than the first speed,
said first and second speeds being redline speeds,
wherein a first performance quantity is defined as the product of the first speed squared and the first area, wherein a second performance quantity is defined as the product of the second speed squared and the second area; and wherein a ratio of the first performance quantity to the second performance quantity is between 0.8 and 1.5.

2. The turbine section as set forth in claim 1, wherein said ratio is above or equal to 1.0.

3. The turbine section as set forth in claim 1, comprising a mid-turbine frame positioned intermediate said fan drive and second turbine sections, and said mid-turbine frame having a first bearing supporting an outer periphery of a first shaft rotating with said second turbine section.

4. The turbine section as set forth in claim 3, wherein said mid-turbine frame also including a second bearing supporting an outer periphery of a second shaft rotating with said fan drive turbine section, and said second bearing supporting an intermediate portion of said second shaft.

5. The turbine section as set forth in claim 3, wherein said mid-turbine frame being provided with a guide vane positioned intermediate said fan drive and second turbine sections.

6. The turbine section as set forth in claim 5, wherein said fan drive and second turbine sections will rotate in opposed directions, and said guide vane is a turning guide vane.

7. A gas turbine engine comprising:

a fan;

a compressor section in fluid communication with the fan;

a combustion section in fluid communication with the compressor section;

a turbine section in fluid communication with the combustion section, wherein the turbine section includes a fan drive turbine section and a second turbine section, wherein said fan drive turbine section has a first exit area at a first exit point and is configured to rotate at a first speed, wherein said second turbine section has a second exit area at a second exit point and is configured to rotate at a second speed, which is higher than the first speed, said first and second speeds being redline speeds, wherein a first performance quantity is defined as the product of the first speed squared and the first area, wherein a second performance quantity is defined as the product of the second speed squared and the second area;

wherein a ratio of the first performance quantity to the second performance quantity is between 0.5 and 1.5; and a gear reduction is included between said fan and a shaft driven by the fan drive turbine section such that the fan will rotate at a lower speed than the fan drive turbine section.

8. The gas turbine engine as set forth in claim 7, wherein said ratio is above or equal to 0.8.

9. The gas turbine engine as set forth in claim 8, wherein said ratio is above or equal to 1.0.

10. The gas turbine engine as set forth in claim 7, wherein the compressor section includes a first compressor section and a second compressor section, wherein the fan drive turbine section and the first compressor section will rotate in a first direction, and wherein the second turbine section and the second compressor section will rotate in a second opposed direction.

11. The gas turbine engine as set forth in claim 10, wherein said second turbine section and said second compressor section are straddle-mounted by bearings supported on an outer periphery of a first shaft rotating with said second compressor section and said second turbine section.

12. The gas turbine engine as set forth in claim 7, said second turbine section being supported by a first bearing in a mid-turbine frame.

13. The gas turbine engine as set forth in claim 12, wherein said mid-turbine frame further incorporating a second bearing, said second bearing supporting an outer periphery of a second shaft rotating with said fan drive turbine section.

14. The gas turbine engine as set forth in claim 13, wherein said second bearing supporting an intermediate portion of the second shaft that will rotate with said fan drive turbine section and said first compressor section.

15. A gas turbine engine comprising:

a fan;

a compressor section in fluid communication with the fan;

a combustion section in fluid communication with the compressor section;

a turbine section in fluid communication with the combustion section, wherein the turbine section includes a fan drive turbine section and a second turbine section, wherein said fan drive turbine section has a first exit area at a first exit point and is configured to rotate at a first speed, wherein said second turbine section has a second exit area at a second exit point and is configured to rotate at a second speed, which is higher than the first speed, said first and second speeds being redline speeds, wherein a first performance quantity is defined as the product of the first speed squared and the first area, wherein a second performance quantity is defined as the product of the second speed squared and the second area;

wherein a ratio of the first performance quantity to the second performance quantity is between 0.5 and 1.5; and said compressor section including a first compressor section and a second compressor section, a gear reduction included between said fan and said fan drive turbine section, such that the fan will rotate at a lower speed than the fan drive turbine section.

16. The gas turbine engine as set forth in claim 15, wherein said ratio is above or equal to 0.8.

17. The gas turbine engine as set forth in claim 16, further comprising a mid-turbine frame positioned intermediate said fan drive and second turbine sections, and said mid-turbine frame having a first bearing supporting an outer periphery of a first shaft rotating with said second turbine section.

18. The gas turbine engine as set forth in claim 17, wherein said first shaft is supported on a second bearing on its outer periphery, with said second bearing being mounted to a static structure.

19. The gas turbine engine as set forth in claim 15, wherein said ratio is above or equal to 1.0.

20. The gas turbine engine as set forth in claim 15, wherein the fan drive turbine section and the first compressor section will rotate in a first direction and the second turbine section and the second compressor section will rotate in a second opposed direction, and said fan will rotate in the second opposed direction.

21. The gas turbine engine as set forth in claim 15, wherein the gear reduction is included between the fan and the first compressor section.

* * * * *